INVENTOR.
THOMAS W. PHILLIPS
BY
Herschel C. Omohundro
ATTORNEY

United States Patent Office 3,365,121
Patented Jan. 23, 1968

3,365,121
PIPELINE FLOW BOOSTING SYSTEM
Thomas W. Phillips, Phoenix, Ariz., assignor to The Garrett Corporation, Los Angeles, Calif., a corporation of California
Filed Oct. 20, 1965, Ser. No. 498,407
10 Claims. (Cl. 230—116)

ABSTRACT OF THE DISCLOSURE

The subject system includes a gas turbine engine with a multistage compressor having its inlet connected to receive fluid from a pipeline. After predetermined compression of the fluid, a first portion is directed into the pipeline while the balance, after further compression, is heated and then directed to the turbine to cause engine operation. Fluid discharged from the turbine is returned to the pipeline at substantially the same degree of compression as the first portion. A part of the fluid discharged from the turbine may be burned to heat the fluid used in engine operation. Heat exchangers may utilize the turbine exhaust to preheat the operating fluid as well as the air supplied to burn the fuel. Some of the turbine exhaust may also operate a turbofan to supply air for combustion purposes.

---

This invention relates generally to transportation and more particularly to the movement of fluids, such as natural gas, from one location to another. Ordinarily such fluids are made to flow through conduits by applying pressure to the fluids; and at spaced locations, elevations, and the like, means are provided to apply to the fluids a boost in pressure to compensate for the friction, gravitational forces, etc., encountered by the fluids as they flow through the conduits.

The primary object of this invention is to provide a system of applying booster pressure to fluid in a pipeline, in which system fluid from the pipeline is used as an operating fluid in an engine and then returned to the pipeline following discharge from the engine.

Another object of the invention is to provide a system of applying booster pressure to fluid in a pipeline, the system having a gas turbine engine with a compressor to receive fluid from an upstream portion of the pipeline and discharge at least part of the fluid into a downstream portion of the pipeline under an increased pressure, some of the compressor output being heated and supplied to the turbine section of the engine to drive the compressor, the fluid exhausted from the turbine also being directed into the downstream portion of the pipeline.

Still another object of the invention is to provide the system of the preceding paragraph with means for indirectly heating the portion of the fluid used to operate the turbine.

A further object of the invention is to provide the system of the two preceding paragraphs with means for utilizing some of the fluid discharged from the compressor as fuel for indirectly heating the portion of the fluid before it is supplied to the turbine.

A still further object of the invention is to provide the system of the three preceding paragraphs with heat exchange means to increase the efficiency of the system by preheating the fluid prior to supplying it to the heating means, preheating the air used to support combustion in the heating means, and cooling the fluid exhausted from the turbine section of the engine before returning it to the pipeline.

Another object of the invention is to provide the system or systems mentioned above with turbine driven means for supplying air under pressure to the heating means and to drive the turbine of such means with gases exhausted from the main turbine, such gases then being supplied to the heating means to be burned to heat the gases employed to drive the main turbine.

Other objects and advantages will become apparent from the following description of closed pipeline booster systems embodying the principles of the present invention which are schematically illustrated in the appended drawing.

Figure 1:
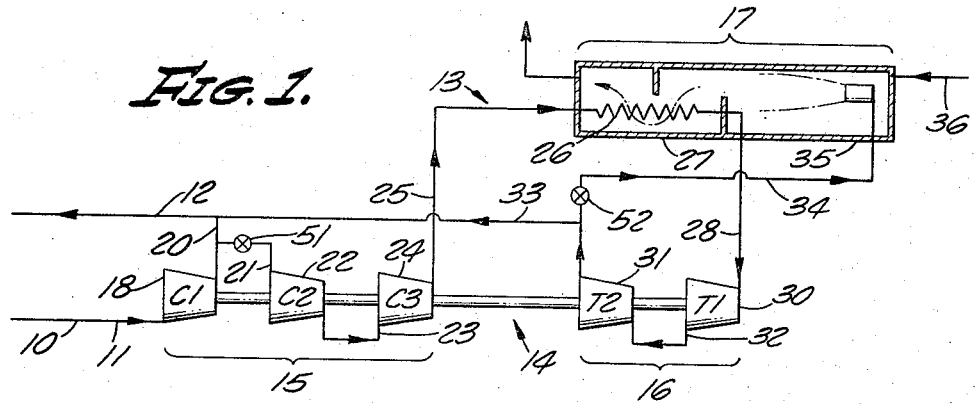
FIG. 1 is a view schematically illustrating a portion of a gas or similar fluid conducting pipeline with a basic booster system incorporated therein.
Figure 3:
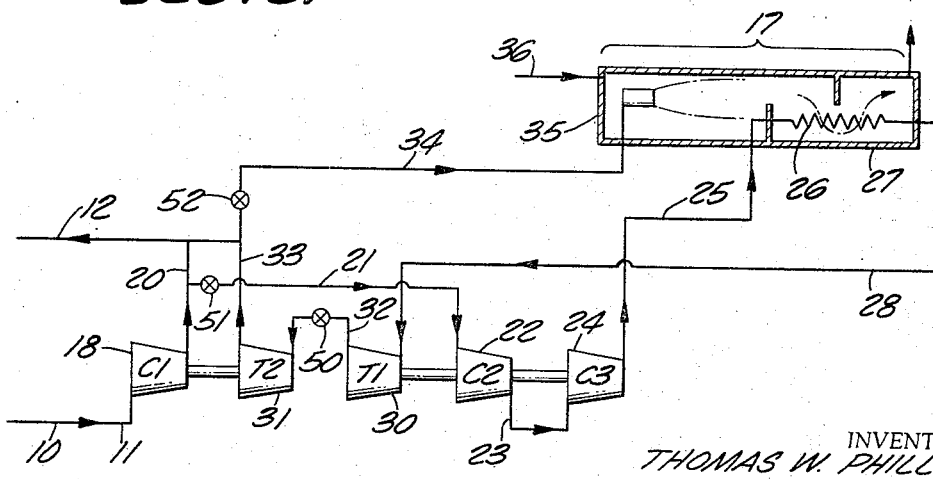
FIG. 3 is also a similar view of a modified system the engine of which comprises a split turbine to provide the system with more flexibility.

Reference to FIG. 1 of the drawings will show a pipeline represented by the numeral 10. In the present installation, line 10 includes an upstream section 11 and a downstream section 12. The flow boosting system forming the subject matter of this invention is connected with the pipeline 10 between the sections 11 and 12. In FIG. 1, the system is designated generally by the numeral 13. The system shown in FIG. 1 is a basic system including only the absolutely essential elements. It includes a gas turbine engine designated generally by the numeral 14, the engine being schematically shown. It includes a compressor section 15 and a turbine section 16. The engine also includes heating means designated by the numeral 17. While the compressor section is shown as including three separate stages, it is obvious that a single stage could be employed if desired. It is important to note, however, that if a single stage of compression is employed, some changes in the system duct connections may be necessary to permit the turbine gases to be discharged into a region of lower pressure. The turbine 16 includes two stages. Likewise, this portion of the engine could employ a single or multiple series of stages, or, as shown in FIG. 3, a split turbine, if found desirable. The upstream section of the pipeline connects with the inlet of the first stage 18 of the compressor and the outlet of this stage is connected by passage 20 with the downstream section 12 of the pipeline. It will be obvious that when the engine is operated, fluid from the pipeline will be drawn into the compressor and discharged at a higher pressure into the downstream section 12.

In the embodiment of the invention shown in FIG. 1, a second passage 21 leads from the outlet of the compressor stage 18 to the inlet of the second compressor stage 22. The outlet of this stage is connected by passage 23 to the inlet of the third stage 24. The outlet from this stage is connected by passage 25 with a coil or other passage 26 formed in an indirect type of heat exchanger 27. The outlet from this coil is connected by line 28 with the inlet of the first turbine stage 30. The second turbine stage 31 has its inlet connected by passage 32 with the outlet of the first turbine stage. The outlet from the second turbine stage is connected by a passage 33 with the downstream section of the pipeline 10. It is obvious that fluid from the compressor may be circulated through the heat exchanger 27 to be heated and supplied to the turbine portion of the engine to effect the engine operation. This fluid is only heated, not burned. The discharge from the turbine is returned to the pipeline for transfer to some other remote point of use. To effect the heating of the fluid in the heat exchanger 27, some of the exhaust fluid from turbine section 31 is directed through a line 34 to a combustor 35 where it is burned with air supplied through inlet 36. The products of combustion are passed through the heat exchanger 27, around the coil 26, to heat the fluid employed to operate the turbine. The waste products from the heat exchanger in the first form of the invention are discharged directly to the atmosphere.

It is obvious from the foregoing that a closed system is provided which receives fluid, such as natural gas, from pipeline 10, increases the pressure thereof, and returns it to the pipeline for transportation to some remote point of use. Some of the fluid is employed to effect the operation of a gas turbine engine, which in turn drives the compressor. A small portion of the fluid is withdrawn from the system to supply the combustor for heating the fluid used to operate the engine. It is obvious that the combustor could employ other fuel if so desired.

Figure 2:
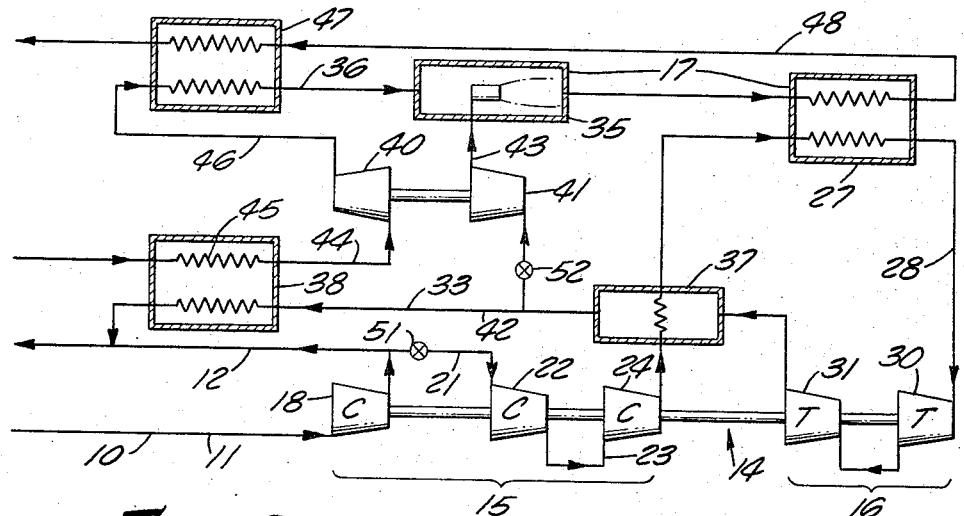
FIG. 2 is a similar view of a booster system modified to increase the efficiency thereof.

In FIG. 2 of the drawing, means are provided to increase the efficiency of the basic system shown in FIG. 1. These means include recuperator, cooler, and air preheater means, as well as means for supplying air under pressure to the combustor. As shown in FIG. 2, pipeline 10 with upstream and downstream portions 11 and 12 are also provided. The gas turbine engine 14 with compressor and turbine sections 15 and 16, respectively, are also included, as are heating means 17. These parts of the system are connected as in FIG. 1; however, a recuperator 37 is provided to preheat the fluid flowing from the third stage 24 of the compressor to the heat exchanger 27. This recuperator also receives gases exhausted from the second turbine stage 31. These heated gases are utilized in the recuperator to preheat the turbine operating gases prior to their introduction to the heater 27. These hot exhaust gases, after flowing from the recuperator, are cooled in a cooler-type heat exchanger 38 to acceptable limits prior to being returned to the downstream section of the pipeline.

In the form of the invention shown in FIG. 2, the combustor is supplied with air under pressure to effect better combustion. To supply this air, use is made of a compressor or fan 40 arranged to be driven by a turbine 41. This turbine is operated by some of the gases exhausted from the turbine section of the engine 14. The gases are withdrawn from a line 42 leading from the recuperator to the cooler 38. These gases are supplied to the inlet of the turbine 41 and after passage through this turbine are supplied through line 43 to the combustor 35. Operation of the turbine 41 drives the fan 40 and draws air into the inlet of the fan through a passage 44 which includes a passage 45 in the cooler 38. Atmospheric air is utilized, the fan 40 discharging such air through a line 46 to a heat exchanger 47. This heat exchanger operates as a preheater for the air, the products of combustion discharged from the heater 27 being supplied through line 48 to heat exchanger 47 for heat exchange relationship with the air prior to its introduction to the combustor. Compressor 40 also serves to counteract the resistance or pressure drop exerted on the combustion air by the heat exchangers and lines leading to the combustor 35. It should be obvious from the foregoing description taken in connection with FIG. 2 of the drawings that a much more efficient operation will result than may be secured with the basic system shown in FIG. 1. Most of the heat supplied to the fluid by the heater 17 will be utilized and the exhaust gases from the turbine will be returned to the pipeline at the approximate temperature of the gases supplied directly thereto by the compressor. To secure increased flexibility of the booster systems incorporating the present invention, use may be made of the commonly known split or dual shaft turbine. A booster system with such a turbine is schematically shown in FIG. 3. In this modified system the first compressor 18 is driven by the second stage turbine 31; the shaft connecting this turbine and compressor 18 is separate from the shaft connecting compressor stages 22 and 24 with the first stage turbine 30. It should be noted that in this system means 50 may be provided at the inlet to turbine 31 to vary the speed of the turbine and consequently the compressor to compensate for variations in the flow of fluid in pipeline 10. The remainder of the system of FIG. 3 is substantially identical with the basic system shown in FIG. 1.

It should be obvious that suitable means such as schematically indicated valves 51 and 52 may be provided in lines 21 and 34, respectively, to control the volume of gas taken from the system to operate the engine and heater means. By incorporating the turbomachinery forming the booster system directly in the high pressure pipeline as indicated herein, the size of such machinery can be maintained at a minimum and still the necessarily large output power required may be produced.

While the booster systems are shown only schematically, it is obvious that many minor changes may be made therein in the incorporation of the principles into a practical working structure. It is intended to cover all such variations as may fall fairly within the scope of the appended claims.

I claim:

1. A pipeline flow boosting system, comprising:
    (a) a gas turbine engine having compressor means with the inlet and outlet thereof communicating with the pipeline and turbine means operatively connected with said compressor means;
    (b) means communicating with the outlet of said compressor means and utilizing fluid exhausted by the turbine for fuel to indirectly heat at least a portion of the fluid from the pipeline compressed by said compressor, and supply such heated fluid to said turbine means to effect engine operation; and
    (c) means for returning the fluid exhausted by said turbine means to the pipeline.

2. A pipeline flow boosting system as specified in claim 1 in which recuperator means are provided to pass the fluid to be heated and supplied to the turbine means through heat exchange relationship with the exhaust gases from said turbine means.

3. A pipeline flow boosting system as specified in claim 1 in which means are provided to supply combustion supporting air under pressure to the fluid heating means, such air supplying means being driven by a part of the exhaust gases from said turbine means.

4. A pipeline flow boosting system as specified in claim 3 in which heat exchange means are provided to pass the air supplied to the fluid heating means through heat exchange relationship with a part of the exhaust gases from said turbine means.

5. A pipeline flow boosting system as specified in claim 1 in which the compressor means has a plurality of stages, the output from at least one stage being returned to the pipeline at the outlet side of the compressor means, the output from the final stage being directed to said heating means.

6. A pipeline flow boosting system as specified in claim 5 in which recuperator means are provided to pass the output from the final compressor stage through heat exchange relationship with the exhaust gases from said turbine means before such output is directed to said heating means.

7. A pipeline flow boosting system as specified in claim 6 in which heat exchange means are provided to pass the exhaust gases from said recuperator means through heat exchange relationship with air being supplied to said heating means to cool said exhaust gases before the return thereof to said pipeline.

8. A pipeline flow boosting system, comprising:
    (a) a gas turbine engine having a multistage compressor means and turbine means operatively connected to one another, the inlet to said compressor means communicating with said pipeline to receive fluid therefrom;
    (b) a first means for directing some of the fluid after a predetermined compression thereof to a downstream section of said pipeline;

(c) a second means for heating the rest of the fluid after additional compression thereof;

(d) a third means for applying such heated fluid to the turbine means of said gas turbine engine to effect the operation of such engine; and (e) a fourth means for returning the fluid discharged from said turbine portion to said pipeline at a pressure substantially equal to that of the fluid directed to the pipeline by said first means.

9. A pipeline flow boosting system, comprising:

(a) a split shaft gas turbine engine having a first compressor connected for operation by a first turbine section and a second compressor connected for operation by a second turbine section, the first compressor communicating with said pipeline to receive fluid therefrom and return it to the pipeline under increased pressure, the second compressor receiving fluid discharged from the first compressor;

(b) means connected to receive and heat fluid from said second compressor and successively apply the same to said second and first turbine sections to operate the compressors connected therewith; and (c) means for discharging the exhaust from said first turbine section directly into said pipeline at the outlet of said first compressor.

10. A pipeline flow boosting system, comprising:

(a) compressor means having a plurality of compressor stages for receiving fluid from the pipeline and progressively increasing the pressure thereof, some of the fluid being returned to the pipeline at a predetermined intermediate stage;

(b) turbine means connected with said compressor means to effect the operation thereof;

(c) means communicating with the final compressor stage for heating fluid therefrom and supplying such heated fluid to said turbine means to effect operation of the turbine and compressor means; and (d) means for directing the fluid exhausted from said turbine means to the pipeline at the outlet side of said intermediate stage.

References Cited

UNITED STATES PATENTS

| | | | |
|---|---|---|---|
| 2,776,087 | 1/1957 | Walter | 230—116 |
| 3,107,482 | 10/1963 | Fono | 60—39.03 X |

EDGAR W. GEOGHEGAN, *Primary Examiner.*